J. W. NYSTROM.
EYE-PIECES FOR TELESCOPES.
No. 169,917.                     Patented Nov. 16, 1875.
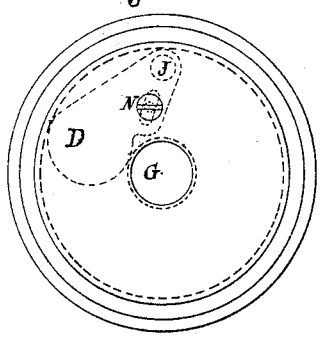
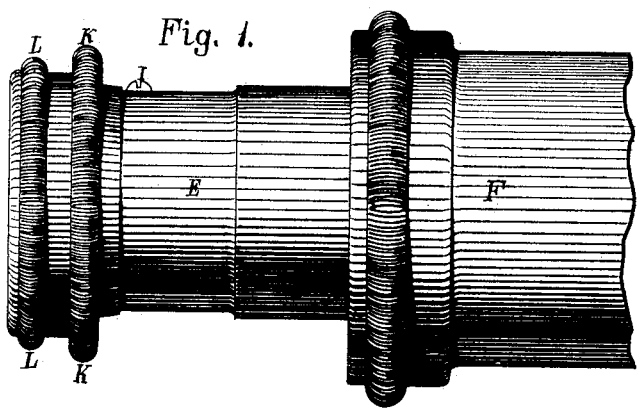
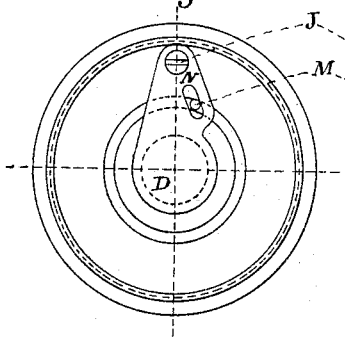
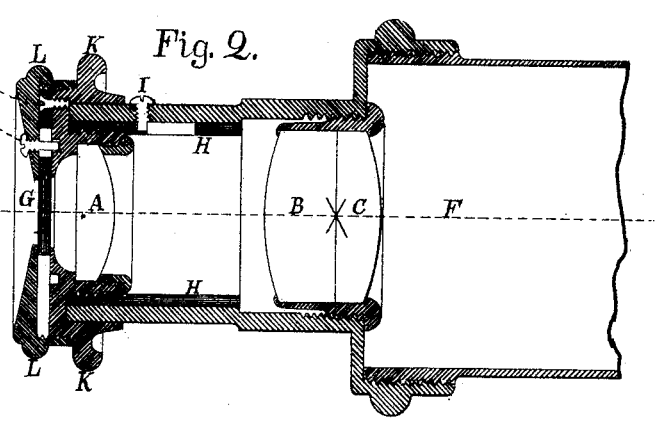
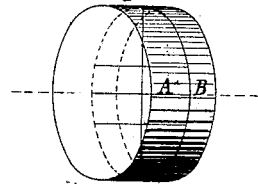
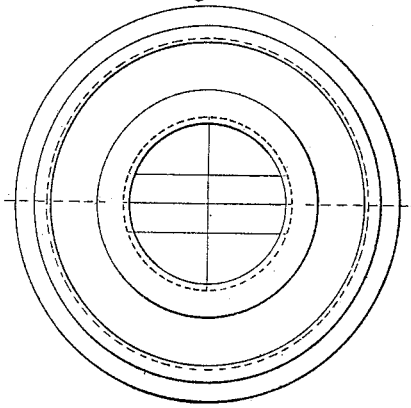
Witnesses—
Inventor—
John W. Nystrom

UNITED STATES PATENT OFFICE.

JOHN W. NYSTROM, OF PHILADELPHIA, PENNSYLVANIA.

IMPROVEMENT IN EYE-PIECES FOR TELESCOPES.

Specification forming part of Letters Patent No. 169,917, dated November 16, 1875; application filed October 19, 1875.

*To all whom it may concern:*

Be it known that I, JOHN W. NYSTROM, of the city and county of Philadelphia, in the State of Pennsylvania, have invented a new and Improved Eye-Piece for Telescopes, by which are secured permanent cross-hair lines, the eyeglass protected from dust or foul; and I hereby declare that the following is a full and exact description thereof, reference being had to the accompanying drawings and letters marked thereon.

The nature of my invention consists in placing the cross-hair lines in the field-lens of the eye-piece in such a manner that those lines are thoroughly protected from injury; and in protecting the eyeglass from dust or foul by a commodious cover, which is operated by slot motion.

In telescopes for field-instruments the cross-hairs are generally made of spider-web, which is delicate to handle, and very often gets out of order, by which the instrument is rendered useless until new cross-hairs are replaced, which is a difficult operation, and may delay the work in the field, as the telescope must be readjusted for the new cross-hairs.

Cross-hair lines have been drawn on a flat piece of glass placed in the focus of the telescope, before the eye-piece, and, being also in the focus of the eyeglass, the slightest dust or foul settling on that flat glass in the focus is seen through the eyeglass, and presents a disagreeable field of observation.

In order to avoid the above-mentioned difficulties I make the field-lens of the eye-piece in two pieces, and draw the cross-hair lines on one of them, after which they are cemented together with said lines in the inside, and thus thoroughly protect them from injury. The focus of the telescope is brought to the cross-hair lines in the compound field-lens of the eye-piece, and the focus of the eyeglass is also brought to the same lines, by which a clear field is obtained. The dust or foul that may settle on the outer sides of the compound field-lens is not seen through the eyeglass, because those sides are out of focus.

It is not customary, in engineering field-instruments, to protect the eyeglass from dust or foul, which may settle thereon and obscure the field of observation. In spy-glasses the eyeglass is generally covered by a slide, which incommodiously projects outside of the eye-piece during the observation, or when the eyeglass is uncovered.

In order to avoid this difficulty I make a cover, which is moved over the eyeglass by a slot motion, so that said cover is not seen during the observation.

To enable others skilled in the art to make and use my invention, I will proceed to describe its construction and operation, reference being had to the accompanying drawings.

Figure 1 represents a side elevation of the body E of the eye-piece screwed on the end of the telescope F. Fig. 2 represents a longitudinal section of the eye-piece, showing the eyeglass A, the compound field-lenses B X C, and the cover D. Fig. 3 represents an end view of the eye-piece, showing by the dotted lines the cover D removed from the sight-hole G. Fig. 4 represents the end view of the eye-piece with the sight-hole piece L removed, showing the cover D over the eyeglass A. Fig. 5 represents an end view of the eye-piece as seen from the telescope, showing the cross-hair lines in the field-lens. Fig. 6 represents a perspective view of the compound field-lens, showing the position of the cross-hair lines.

Like letters refer to like parts in all the figures.

The field-lens is represented to be composed of two plano-convex lenses, B and C, Fig. 2, in which the cross-hair lines X are drawn on either one of the plane sides forming the joint; but it is not necessary that the two lenses should be plano-convex, for either one of them may be plane on both sides, or even concave, and the joint X may be made spherical, depending on the optical combination of the telescope.

The lenses B and C may be placed loosely together in the cell; but, in order to thoroughly prevent dust or foul from settling on the hair-lines, I prefer to cement the joint X with Canada balsam, or some other cement, making the compound lens perfectly transparent.

The focus of the telescope is brought to X, where the field is viewed through the eyeglass A, which can be moved in or out by the sliding tube H to bring its focus to X. The sliding tube H has a slot for the screw I, to prevent it from being drawn out too far. The eyeglass-cover D, Fig. 4, moves around the center or screw J fastened in the stationary part K. The part L L turns on a screw-joint between K and L. The screw M is fastened in the part L, and moves the cover D through the slot N, so that, by turning the part L, the cover D is moved to cover or uncover the eyeglass A, which should be uncovered only when observations are made.

I claim as my invention—

1. A lens of the eye-piece provided with hair-lines, inclosed therein, substantially as set forth.

2. The eyeglass-cover D, pivoted at one end, and provided with a slot, in combination with a rotating piece having a pin, substantially as set forth.

JOHN W. NYSTROM.

Witnesses:
O. G. HEMPSTEAD,
WM. O. HEMPSTEAD.